A. B. WALTERS.
MEANS FOR LOCKING THE STEERING MECHANISMS OF MOTOR VEHICLES.
APPLICATION FILED AUG. 21, 1909.
961,390.
Patented June 14, 1910.
2 SHEETS—SHEET 2.
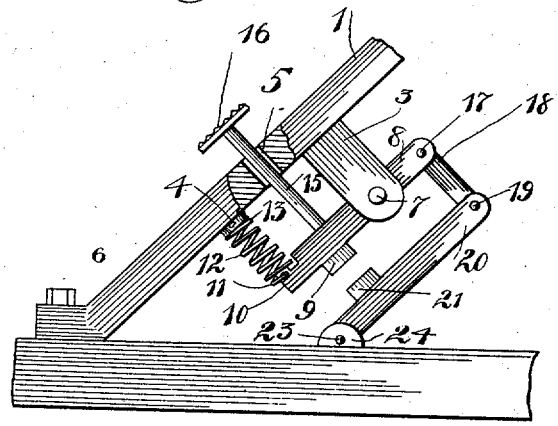
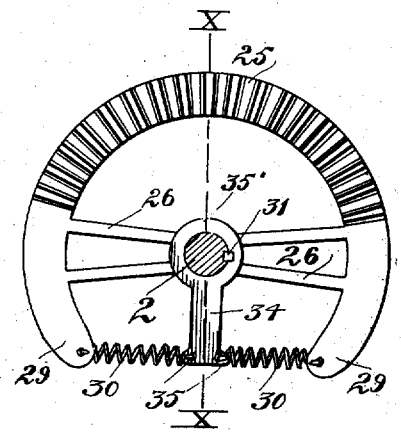
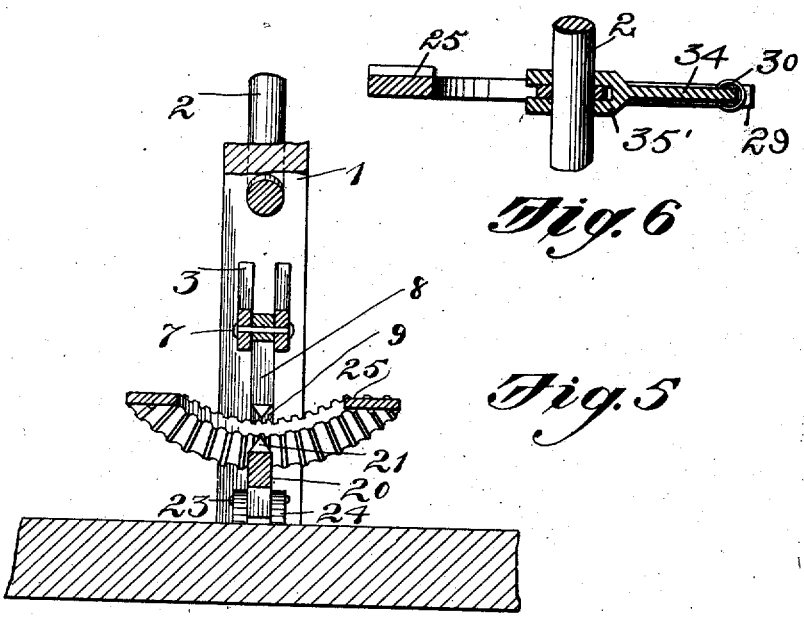
WITNESSES
INVENTOR
Arthur B. Walters
By Attorneys

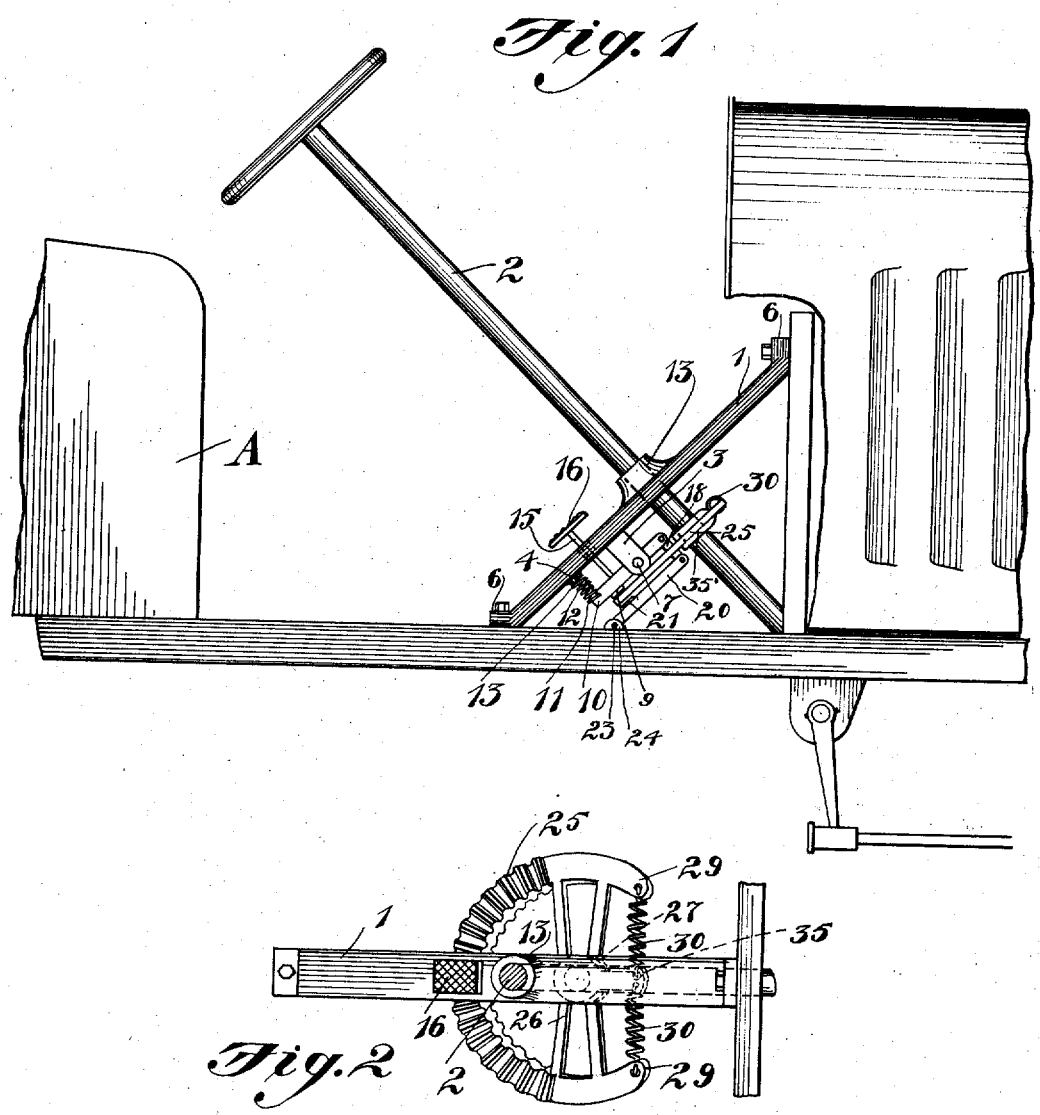

UNITED STATES PATENT OFFICE.

ARTHUR B. WALTERS, OF ABILENE, KANSAS.

MEANS FOR LOCKING THE STEERING MECHANISMS OF MOTOR-VEHICLES.

961,390.  Specification of Letters Patent.  Patented June 14, 1910.

Application filed August 21, 1909. Serial No. 513,992.

*To all whom it may concern:*

Be it known that I, ARTHUR B. WALTERS, a citizen of the United States, residing at Abilene, in the county of Dickinson and State of Kansas, have invented certain new and useful Improvements in Means for Locking the Steering Mechanism of Motor-Vehicles, of which the following is a specification.

This invention relates to certain new and novel means for locking the steering mechanism of motor vehicles.

The object of my invention is to provide a pedal operated mechanism, arranged to yieldingly hold the steering shaft of an automobile or motor vehicle against casual rotation.

Another object is to provide a mechanism whereby the steering shaft of a motor vehicle may be positively but yieldingly held or checked, in a manner however permitting the instant release of the locking mechanism upon the release of a pedal operated pawl.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 shows a fragmentary portion of a motor vehicle equipped with my locking mechanism, Fig. 2 shows a top view of the locking mechanism, Fig. 3 is an enlarged detached detail of the locking pawls, Fig. 4 shows a top view of the gear sector, Fig. 5 shows a transverse sectional view through the steering shaft and locking mechanism, Fig. 6 is a vertical section taken on line *x—x* of Fig. 4.

In the operation of a motor vehicle, there is a constant movement of the steering wheel, especially where the vehicle passes over rough and uneven ground, which jarring and trembling movement is transmitted to the arms of the operator of the steering mechanism. At times, the shock of the impact of a wheel striking an obstruction is so great as to throw the steering wheel entirely out of the hands of the operator.

In my present invention, I provide a simply constructed readily operated device, by means of which the steering gear of a motor vehicle may be yieldingly locked so that when the supporting wheels encounter an obstruction, they will momentarily be carried out of their course owing to the shock of the impact, which is however not transmitted to the steering shaft, but is lost and compensated through the medium of my attachment, to the end that the wheels are instantly thrown into their original direction.

In the accompanying drawings the letter A designates a fragmentary portion of a motor vehicle, and 2 the steering shaft. This shaft is revolubly supported within the supporting bracket 1, the bracket being provided with the boss 13 to provide a proper bearing surface. In addition to this boss, the bracket carries the downwardly extending ear 3, the downwardly extending ear 4, and the slot 5 positioned between the ears 3 and 4. This bracket is provided with the perforated securing ears 6 through which suitable bolts extend employed in securing the bracket to the vehicle frame.

Held within the ear 3 is the pin 7 pivotally carrying the upper dog 8, this dog or pawl being provided with the downwardly extending lip 9 and the terminal ear 10. Held within the ear 10 is the lower end 11 of the helical spring 12 which has its upper end 13 curved through the ear 4 in such a manner that the pawl or dog is normally carried toward the bracket as clearly disclosed in the drawings. Extending from this pawl is the stem 15 which passes through the slot 5 and is provided with the pedal head 16 by means of which this pawl is operated. Carried within the opposite end of this pawl is the pin 17 from which swings the link 18, which link by means of the pin 19 is pivotally connected to the lower pawl 20 which is provided with the upwardly extending lip 21 arranged for coaction with the lip 9, these lips 9 and 21 being normally held in parallel spaced relation. The lower rearward end of the lower pawl 20 is held to the pin 23 carried within the ear 24 secured to the bottom or floor of the vehicle. As shown, the two pawls are held in an inclined position and in a plane parallel to the axis of the steering shaft.

Held to the steering shaft 2, is the gear sector 25 which is in the form of a mutilated annulus, a portion of the annulus being removed. Extending from the gear sector 25 are the brace bars 26 which radiate from the hub 27 which hub loosely contains the steering shaft 2 as disclosed. This gear sector has both its upper and its lower faces provided with teeth to a point covering approximately a distance of a hundred and eighty degrees. The ends of this gear sector 25 are in the form of terminal perforated ears which are arranged to receive the bent ends of the helical springs 30, two such springs being used.

Held to the steering shaft 2 by means of the key 31, is the forked arm 34 the terminal bosses 35' of which serve as a guide for holding the gear sector as shown, this gear sector being permitted a free rotary movement between the forked ends of this arm 34. Extending in opposite directions from the arm 34 are the two securing ears 35 which ears are arranged to receive the opposite ends of the helical springs 30, the arm 34 being arranged to be yieldingly held between the terminal ears 29 of the gear sector 25. As shown, this gear sector 25 is yieldingly held to the steering shaft 2 and rotates immediately between the extending lips of the upper and lower pawls 8 and 20. Normally the gear sector 25 responds to every movement of the steering shaft, this shaft however, being permitted an independent movement however within certain limits by virtue of the yielding connection, as embodied in the arm 34 and the springs 30.

The operation of the device is very simple. The steering wheel having been set to guide the vehicle in a proper direction, the operator presses one of his feet upon the pedal 16 which will result in the lip of the upper pawl being carried downward into engagement with the upper teeth of the gear sector 25, while the link 18 will simultaneously swing the lower pawl 20 upward so that the lip 21 engages the under teeth of the gear sector 25, the steering shaft under these conditions being firmly held by means of these two pawls. Should the supporting wheels strike an obstruction while the steering shaft is in a locked condition, the wheels will be permitted to respond to the shock which is however not transmitted to the steering shaft, but is lost in the helical springs 30 which instantly force the wheels into their proper direction. In this way all the fatigue and strain is removed from the operator's arms by being compensated by this locking mechanism.

From the foregoing it will be seen that the shaft proper is not locked but that this shaft carries a yieldingly held member which is locked.

The device is simple and inexpensive in construction, and both durable and efficient in operation and the locking mechanism may be easily operated.

And having thus described my said invention what I claim as new and desire to secure by United States Letters Patent is:

1. In a steering gear for motor vehicles, the combination with a steering shaft, of a locking sector yieldingly carried by said shaft, a pivotally held pawl, a link extending from said pawl, a pivotally secured pawl secured to said link said pawls being held for coaction with said sector, and means to operate said pawls.

2. A steering shaft having in combination, a yieldingly carried sector, a pawl pivotally held for engagement with said sector, a link carried by said pawl, a second pawl arranged for engagement with said sector and secured to said link, and means to actuate said pawls.

3. In combination, a steering shaft, an arm keyed to said shaft, a gear sector loosely carried by said shaft, springs to connect said sector to said arm, a pivotally held pawl, a link carried by said pawl, a second pivotally held pawl carried by said link, said pawls being arranged for co-action with said gear sector, and means for holding said pawls out of engagement with said gear sector.

4. In a steering gear for motor vehicles, the combination with a steering shaft, of a forked arm keyed to said shaft, a gear sector loosely carried upon said shaft between the forks of said arm, springs connecting said gear sector to said arm, two pivotally held pawls arranged for coaction to engage said gear sector, and means to yieldingly hold said pawls out of engagement with said sector.

In testimony whereof I affix my signature, in presence of two witnesses.

ARTHUR B. WALTERS.

Witnesses:
 Roy D. Laney,
 J. B. Higdon.